United States Patent [19]
Daringer et al.

[11] Patent Number: 6,041,916
[45] Date of Patent: Mar. 28, 2000

[54] CONVEYOR SYSTEM FOR WOVEN-WIRE BELT OPERATIONS

[75] Inventors: Ronald G. Daringer; Richard A. Loeffler, Sr.; H. William West, all of Cambridge, Md.

[73] Assignee: Maryland Wire Belts, Inc., Church Creek, Md.

[21] Appl. No.: 09/114,910

[22] Filed: Jul. 14, 1998

Related U.S. Application Data

[62] Division of application No. 08/644,524, May 10, 1996, Pat. No. 5,816,988.

[51] Int. Cl.[7] .................................................. B65G 23/06
[52] U.S. Cl. ........................................... 198/834; 198/848
[58] Field of Search ..................................... 198/848, 834

[56] References Cited

U.S. PATENT DOCUMENTS

| | | |
|---|---|---|
| 1,305,330 | 6/1919 | Wolever et al. . |
| 2,524,328 | 10/1950 | Platt et al. ............................... 198/848 |
| 2,839,785 | 6/1958 | Stevens . |
| 3,000,149 | 9/1961 | Johnson . |
| 3,339,818 | 9/1967 | Morrow . |
| 3,859,865 | 1/1975 | Conrad ..................................... 198/834 |
| 4,685,557 | 8/1987 | Roinestad ................................ 198/834 |
| 5,449,063 | 9/1995 | Thomas ................................... 198/834 |

*Primary Examiner*—Jospeh E. Valenza
*Attorney, Agent, or Firm*—Burns, Doane, Swecker & Mathis, L.L.P.

[57] ABSTRACT

A roll, along with methods of fabricating and using such roll, for driving a woven-wire conveyor belt, provide substantially-uniform drive across belt width, avoid disruption of belt drive, provide unidirection tracking of such belt, and avoid disruption of conveyed product during treatment of conveyed product at temperatures other than ambient. During conveyance of product for heating or cooling treatment, woven-wire conveyor belts and rolls driving such belts are often at differing temperatures, especially during start-up and shutdown of operations. Such temperature differentials can cause dimensional changes in a belt which change the relative location of belt recesses with respect to the roll surface. Selective shaping and dimensioning of roll protrusions from the widthwise center of a roll toward each lateral end of the roll eliminates mismatching of belt recesses due to changes in belt width during product processing at temperatures other than ambient.

10 Claims, 5 Drawing Sheets

CONVEYOR SYSTEM FOR WOVEN-WIRE BELT OPERATIONS

This application is a divisional of application Ser. No. 08/644,524, filed May 10, 1996 now U.S. Pat. No. 5,816,988.

INTRODUCTION

The present invention relates to longitudinally driving and controlling directional tracking of woven-wire belts during conveying operations. New roll configurations are provided for improved control of woven-wire conveyor belts, particularly during start-up and shutdown of industrial conveying operations for treatment of conveyed product under temperature conditions other than ambient.

BACKGROUND

Woven-wire belts have been driven using a sprocket drive chain attached to each lateral edge of such a belt. And rolls with narrow pin-like protrusions have also been devised for driving a woven-wire belt. In the latter roll drive practice, uniformly-sized pin-like protrusions were often positioned in circumferential bands near each lateral edge of a roll.

SUMMARY OF THE INVENTION

The drive roll teachings of the present invention compensate for varying industrial treatment conditions encountered by a belt while moving with its central longitudinal axis in the same plane as the longitudinal direction of movement, for example, during movement in endless-belt travel.

Manufacturing and operational objectives of new roll configurations of the invention include: (i) obtaining and maintaining a substantially-uniform longitudinally-directed drive across the width of a woven-wire belt, (ii) exercising unidirectional tracking control of the belt in such longitudinal direction of movement, and (iii) avoiding disruption of drive, tracking or conveyed product during product treatment within the range of industrial treatment processes encountered during woven-wire belt conveyance of product, in particular, during start-up and shutdown of such operations using temperature treatment at other than ambient temperature.

BRIEF DESCRIPTION OF THE DRAWINGS

Such objectives and other contributions of the invention are considered in more detail during description of the accompanying drawings, in which.

DETAILED DESCRIPTION OF THE INVENTION

Wire belts are assembled lengthwise, in the direction of intended travel, by interweaving a plurality of helically-wound spirals and associated connector rods to form an elongated belt. That assembly is described in more detail in assignee's patent Ser. No. 5,375,695 which is included herein by reference.

Figure 1:
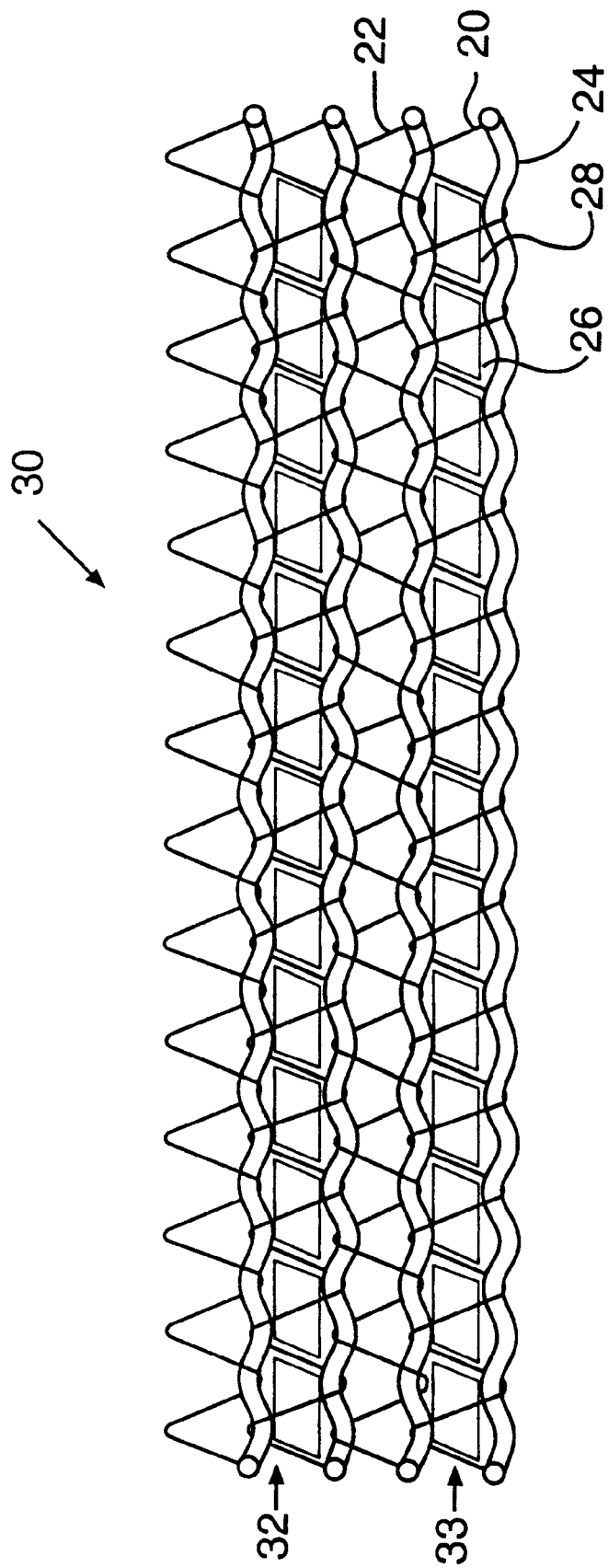
FIG. 1 is a schematic plan view of a portion of a woven-wire belt for describing shaping, as taught by the invention, of roll protrusions for an interfitting relationship with recesses defined by such a woven-wire belt.

In assembling a woven-wire belt, a single helically-wound spiral wire, such as 20 FIG. 1, is associated with two connector rods 22, 24 positioned to be sequentially adjacent in the lengthwise direction of belt assembly and intended travel. Such combination of a helically-wound spiral and two associated connector rods defines a plurality of widthwise side-by-side open-access recesses. Those recesses are used for reception of specially-shaped protrusions, such as 26, 28, which are selectively shaped to provide for uniform drive across belt width and for increasing widthwise dimensional drive contact.

In accordance with the invention, selected protrusions, contiguous to a widthwise central portion of a drive roll, are shaped to interfit within selected belt recesses, contiguous to a widthwise central location of the belt so as to minimize widthwise motion of the belt; that is, to minimize skewing of the belt from unidirectional longitudinal travel.

Also, a pattern of shaping remaining protrusions is provided to avoid departures from smoothly-operating belt travel under the differing effects of changing physical conditions on the belt and/or the roll(s).

The helical wraps of a wire belt spiral, in coaction with a pair of associated connector rods, which are sequentially adjacent in the direction of belt travel, present open-access recesses, on a surface of a belt confronting a roll. Such recesses extend across the width of the belt and are utilized in shaping roll protrusions for uniform belt drive and increased drive contact across the width of the belt.

As shown in FIG. 1, a "balanced" woven-wire belt presents lengthwise alternate left-handed and right-handed helically-wound spirals in the direction of travel and belt assembly. Recesses with open-access on the belt surface confronting the roll are utilized for receiving roll protrusions. A sequentially-alternating row arrangement in the direction of travel is preferred utilizing a balanced weave belt. That arrangement provides advantages for purposes of open access of the specially-shaped protrusions of the invention; and, row spacing in the lengthwise direction of travel of the belt facilitates better seating of bottom-access recesses while also facilitating matching of the specially-shaped protrusions of the invention.

Significant contributions of the invention provide for smoothly-operating engagement with, and disengagement of protrusions from, bottom-access woven-wire belt recess openings across the width of the roll, notwithstanding varying physical conditions experienced during industrial treatment processing of conveyed product.

Substantially matching the shape of centrally-located drive roll protrusions to that of correspondingly-located recessed areas of a belt is used to help control unidirectional in-line tracking of a belt (such as 30 of FIG. 1). A patterned arrangement of remaining shaped protrusions provides increased belt/drive roll contact and helps to distribute belt drive substantially uniformly across the width of the belt.

Belt recesses of the confronting surface of the embodiment of FIG. 1 provide parallel sides which are defined by widthwise alternating helical wraps of a spiral, such as 20. Those widthwise parallel sides of a recess are utilized in widthwise control of protrusions to carry out objectives of the invention. For example, widthwise protrusion between those two parallel sides facilitate unidirectional tracking of a belt.

The remaining sides of a protrusion, in the lengthwise direction of a belt, can provide for balanced contact; the undulating nature of the connecting rods due to crimping of the rods is an important aspect for decreasing belt wear.

Parallelogram-shaped protrusions are machined on the roll surface which can interfit with confronting surface openings. The widthwise parallel sides of protrusions are relied on for interfitting with parallel sides of the spiral helical wraps at open-access recesses on the confronting surface of the belt, and repeated in alternate rows, such as 32, 33 of the preferred balanced weave belt 30. The two sides of a bottom access, which are essentially parallel to adjacent helical wraps of a spiral, are important to widthwise control. The remaining two lengthwise direction sides can establish points of contact for use of parallelogram-shaped protrusions, depending on crimping of such next adjacent connector rods.

Figure 2:
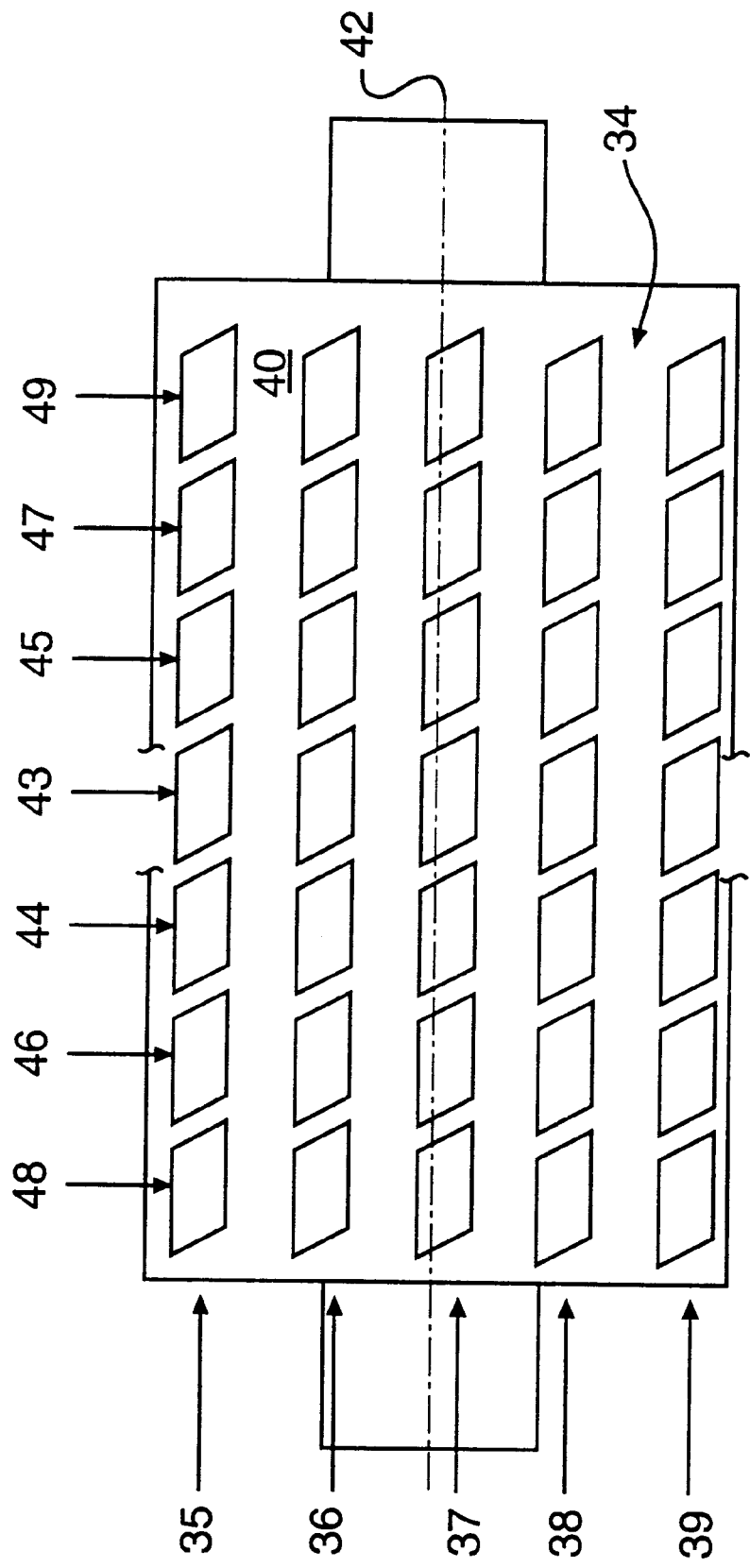
FIG. 2 is a plan view of a roll for describing an initial stage of a specific embodiment of the invention in preparing for substantially-uniform longitudinally-directed drive across the width of a belt when varying physical conditions are encountered during conveyed product treatment operations.

An initial arrangement for machining and positioning protrusions is shown schematically in the FIG. 2 plan view of roll 34. In rows, such as 35, 36, 37, 38, 39, parallelogram-shaped protrusions are machined to provide predetermined positioning of the protrusions on cylindrical surface 40 of roll 34. Surface 40 is substantially cylindrical in relation to central axis of rotation 42 of roll 34; and, protrusions are machined to project radially from that surface.

Individual circumscribing rows of protrusions are predeterminedly positioned between lateral distal ends of roll 34. circumscribing row 43, in the specific embodiment of FIG. 2, is centrally located between opposite lateral ends of roll 34. Circumscribing rows 44 and 45 are on opposite lateral sides of row 43; rows 46 and 47 are positioned, as shown, in laterally intermediate positions; and, rows 48, 49 are positioned at opposite lateral ends of roll 34. The number of circumscribing locations across the width of a roll can be selected to match the number of recess openings, between helical spiral wraps, across the width of the belt. However, with the increased drive contact surface provided by the invention, protrusion open-access recesses can be selectively spaced across belt width symmetrically; for example, with a balanced number of protrusions and recesses from contiguous to such widthwise central location toward each lateral edge of the drive roll and belt. The number of protrusions selected across roll width is selected to provide desired substantially-uniform drive across the width of the belt.

In the specific embodiment being described, protrusions positioned as shown in the pattern of FIG. 2 are further shaped, with emphasis on width dimension, for interfitting within preselected open-access recesses presented by the roll confronting surface of the belt.

Alternating left-handed and right-handed wound spirals in the lengthwise direction of assembly and intended direction of travel of belt 30 (FIG. 1) define, in combination with each associated pair of connector rods (such as 22, 24), alternate rows (indicated by 32, 33) which have open-access recesses on the roll confronting surface of the belt receiving the specially-shaped protrusions of the invention.

The teaching of the invention enables compensation for differential responses of belts and drive rolls due to operations at temperatures other than ambient. Such differential response, without such compensation, could otherwise prevent initially-shaped protrusions of the pattern of FIG. 2 from properly interfitting with belt recesses across the full width of the belt.

In a specific embodiment, differing width dimensions, for protrusions spaced laterally from such widthwise central location toward each lateral end of a roll, are used to accomplish objectives of the invention. Teachings of the specific embodiment (a) compensate for changing physical conditions during start-up and shutdown of operations, (b) compensate for differential responses to temperatures other than ambient encountered during treatment, while continuing to provide substantially-uniform, and to increase contact for, longitudinal-direction drive across the width of the belt, (c) unidirectional tracking, and (d) smoothly-operating engagement and disengagement of the woven-wire belt with protrusions of rotating drive roll(s) in a travel path. Unidirectional tracking, substantially free of side-to-side motion or "skewing," and substantially-uniform lengthwise drive across the width of a belt are partially dependent on smooth access of roll protrusions within prescribed recesses of the woven-wire belt. The belt is woven to present uniform sized access openings across belt width. The cross-sectional dimensions, for receiving parallelogram-shaped protrusions, are based on selection of belt component wire specifications, and fabrication of those belt components.

The protrusions shown in FIG. 2 are initially machined to provide for coordinating locations of the protrusions and recesses, from such widthwise center, toward each lateral end of the roll and the belt. The cross-sectional size of belt recesses coordinates with parallelogram-shaped protrusions, with beveled radial edges as described later, facilitating substantial matching protrusions to recess openings. Respective protrusion locations are coordinated with access openings across belt width in an ambient temperature operation; that is, one which is substantially free of temperature differences between the roll and the belt. For example, in the embodiment of FIG. 1, the width of protrusions and belt openings essentially match across belt width. Unidirectional tracking and extended drive contact are provided.

In a specific embodiment for operations at temperatures other than ambient, centrally-located roll protrusions are closely matched in a widthwise direction with centrally-located bottom-access belt recesses. Those centrally-located portions are used to facilitate unidirectional tracking by proper width selection of roll protrusions and belt recesses. At other locations, compensation for differential effect of temperature on the belt and drive roll is compensated by selectively changing the width of protrusions located on each side of such central location toward each lateral edge of a roll.

Compensating to maintain desired widthwise interfitting of roll protrusions and belt recesses takes into account conditions (a) when the belt and roll(s) are subjected to differing conditions during start-up and shutdown of operations, (b) when the belt and roll(s) continuously operate at substantially differing temperatures, or (c) when differing rates of temperature change of rolls and belt, stemming from treatment temperatures differing from ambient, are encountered.

The coefficients of expansion or contraction of roll metals differ only slightly from those of woven-wire belt metals. However, regardless of similar coefficients of expansion, difficulties in matching roll protrusions with belt recesses can be encountered due to a temperature treatment for conveyed product which differs from ambient temperature.

Mismatching of roll protrusions with belt recesses can cause:

(a) excessive wear of the roll protrusions;

(b) excessive wear of woven-wire belts;

(c) nonuniformity in belt drive;

(d) belt buckling;

(e) belt skewing;

(f) permanent distortion of the belt, and (g) spilling of, or damage to, the conveyed product.

Rolls for driving, tracking or reversing direction of travel of a woven-wire belt can be located internally or externally of a conveyed product treatment chamber. Regardless of roll location, a temperature difference occurs between the woven-wire belt and the roll during at least a portion and, sometimes, substantially all, of an operation at a temperature other than ambient. The magnitude of the differential effects of temperature on the belt and the roll(s) can be influenced by such factors as:

(a) location of a roll in the processing line;

(b) temperature of a treatment chamber for the conveyed product;

(c) ambient temperature;

(d) system start-up procedures;

(e) system shutdown procedures;

(f) the mass of a roll;

(g) the mass of the belt, and (h) conveyor speed.

Figure 3:
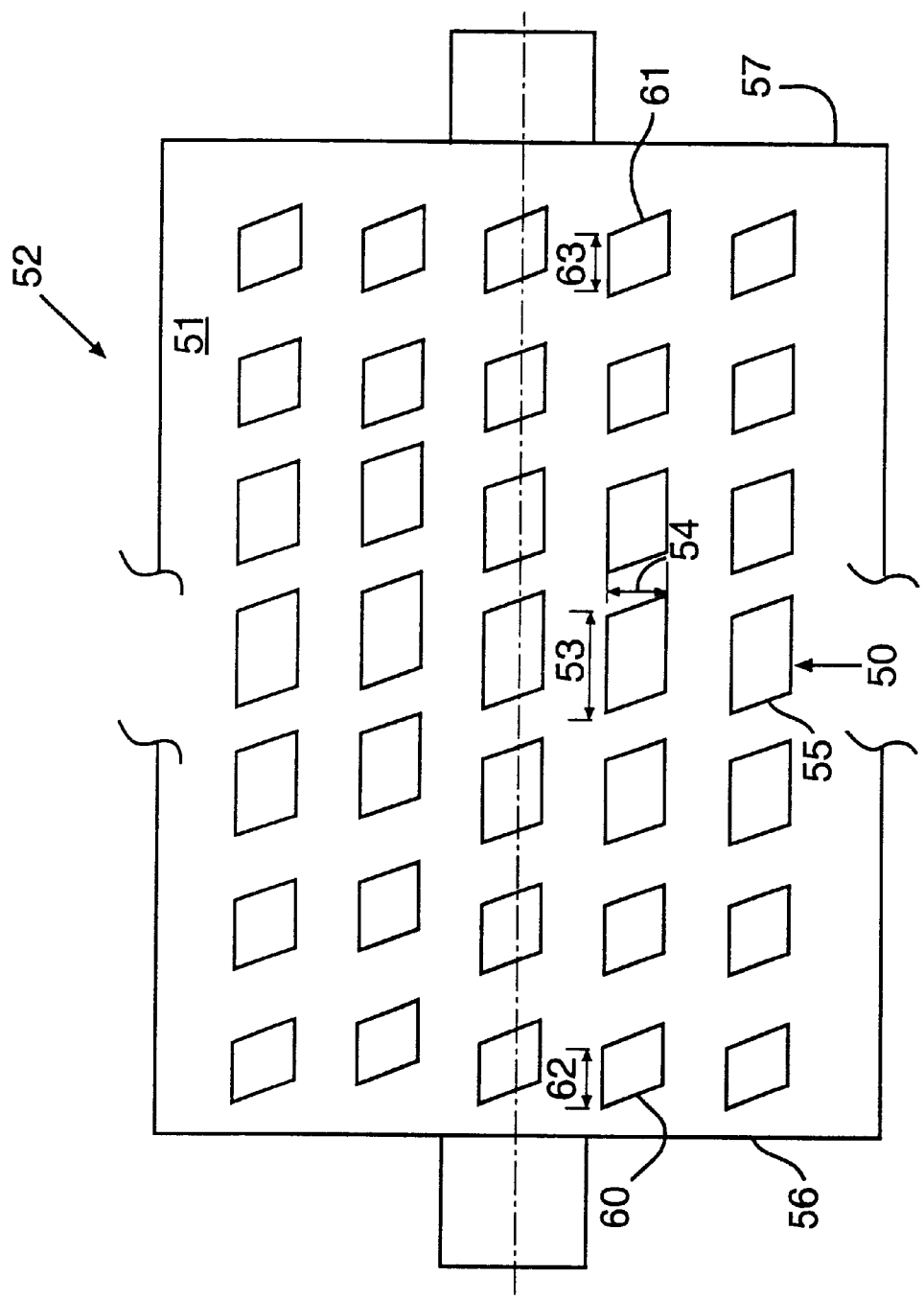
FIG. 3 is a schematic plan view, in expanded form, for describing cross-sectional shaping of protrusions of the embodiment of FIG. 2 so as to improve woven-wire belt operations when physical conditions encountered have a differential effect on a woven-wire belt and associated drive roll.
Figure 4:
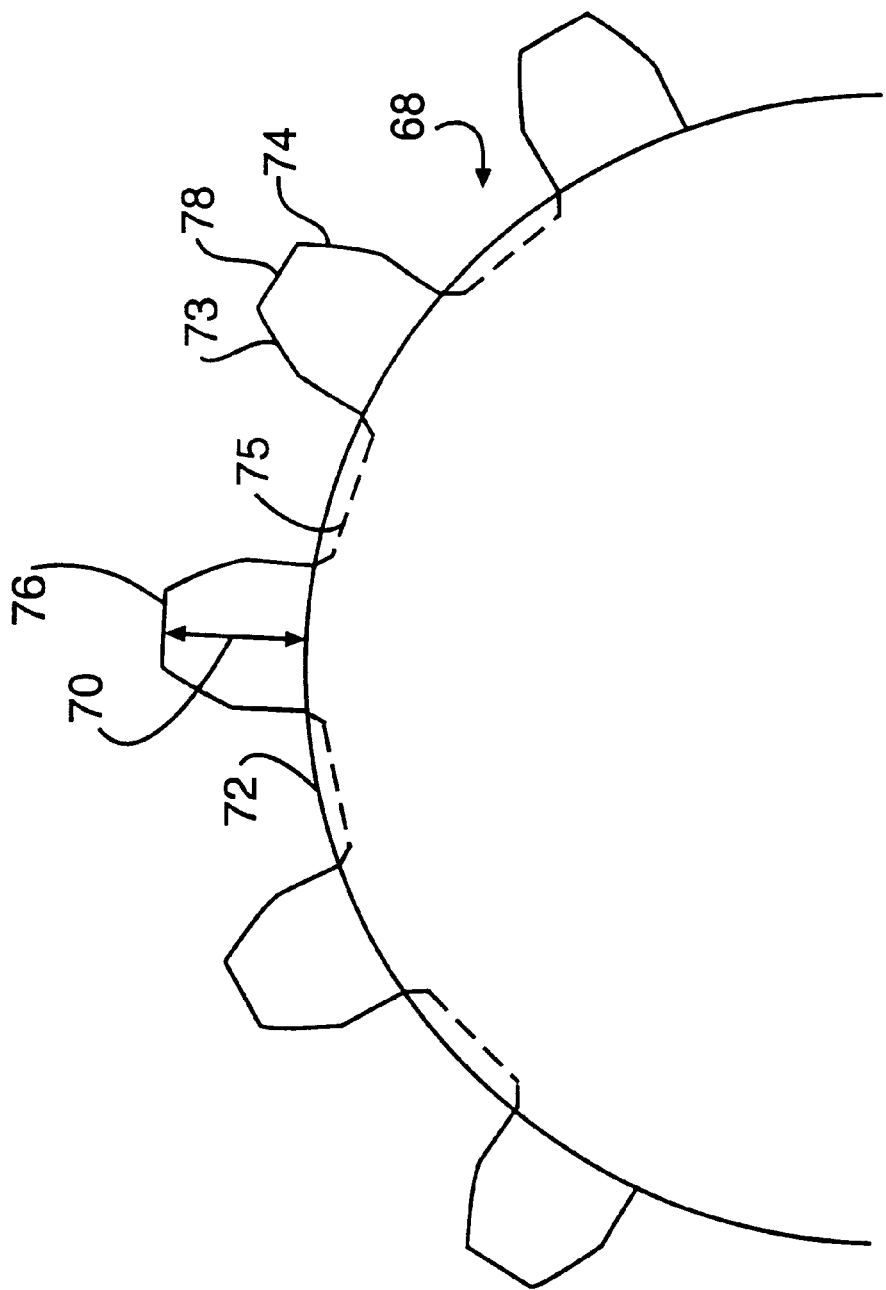
FIG. 4 is a schematic view in expanded form, of a portion of the roll of FIG. 3, taken in a plane which is transversely perpendicular to the central axis of rotation for such roll, for describing special shaping, along a radial dimension, of roll protrusions as taught by the invention.
Figure 5:
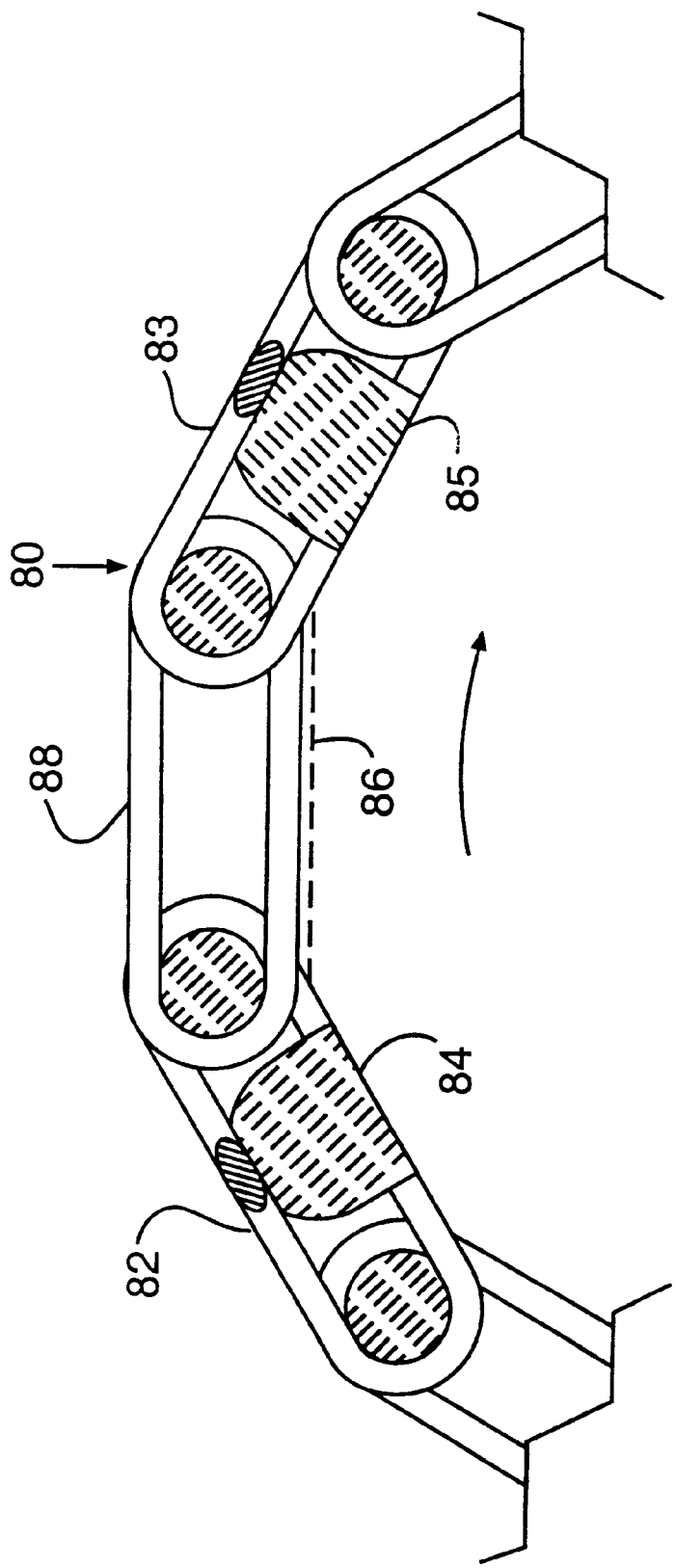
FIG. 5 is a view, partially in cross section, of a portion of a roll and woven-wire belt for describing objective of an interfitting relationship of roll protrusions within a woven-wire belt embodiment of the invention.

FIG. 3 schematically shows a roll configuration for compensating for such differential effects of temperature on a belt and roll(s). The pattern and shape of roll protrusions in FIGS. 3, 4 and 5 are shown schematically, in a proportionately expanded form, in order to assist in visualizing the problems analyzed, and the solutions provided, as part of the invention.

In industrial operations, temperature differences between a belt in a heat treatment chamber, and a roll located externally of the treatment chamber, can be above 100° F. to about 1000° F. for mild steel woven-wire belt and roll materials; and can approach 2000° F. when working with stainless steel materials. Problems resulting from such temperature differences are accentuated with wider belts, such as above four feet to about twelve feet, although woven-wire belt systems of all belt widths can encounter problems as identified by the invention, during operations when encountering changing or differing physical conditions, in particular, differing temperatures.

At start-up of a heat treatment, for example, the belt can be heated and expanded widthwise in a matter of minutes, whereas a drive roll, externally mounted of the treatment chamber, may take an hour or more to start approaching the temperature of the belt; and, may not reach belt temperature before shutdown of a scheduled work period.

As taught herein, for purposes of achieving substantially-uniform lengthwise drive across belt width, smooth engagement and disengagement of a belt with a drive roll, and unidirectional tracking of a driven belt, widthwise changes in the belt are emphasized for compensation purposes. Dimensional control of protrusions is used to maximize widthwise interfitting at centrally-located portions of the belt and the roll. And, widthwise dimensional control of protrusions is used to avoid mismatching of a bottom-surface recess opening at any location across the width of the belt.

Referring to FIG. 3, a circumferential row 50 of protrusions is established between distal lateral ends of roll 52, at its widthwise center. Width 53, for protrusion in circumferential row 50, is selected to maximize a widthwise interfitting relationship with the similarly centrally-located belt recesses. The protrusions in circumferential row 50 of FIG. 3 are preferably of the same size spaced circumferentially around the roll so as to interfit in alternately located bottom-access recesses, along the length of a balanced weave belt. A pair of circumferential rows, similar to row 50, can be used at such widthwise central location.

The effects of temperature differences are significantly compensated for utilizing the width dimension of protrusions. Maximizing widthwise interfitting is handled locally at and near such widthwise central portion of the belt and roll, notwithstanding a possible difference in temperature between the roll and the belt. That is, the effect of a temperature difference, in which the belt heats up faster than the roll, is handled by interfitting of roll protrusions in belt recesses at such central location. The cross-sectional width dimension of belt recesses at such central location can be slightly larger than the width dimension of correspondingly-located protrusions, in order to provide for smooth interfitting, while also providing adequate control of unidirectional tracking.

But, as taught herein, incremental changes in the location of confronting surface belt recesses, due to temperature differences of the belt with respect to a roll, are cumulative toward each such widthwise lateral edge of the belt. In a specific embodiment, such progressively-increasing effect on the location of the recesses, in relation to the protrusions on the roll, in proceeding toward each lateral edge, is compensated for by progressively diminishing the width of the protrusions in proceeding from such central location toward each lateral end of the roll.

While temperature differences and expansion during heat treatment operations have been specifically refereed to, it is understood that the effects of low temperature treatment, for example, about −50° F., of conveyed product with respect to ambient temperature involve contraction during a delayed equilibrium between temperatures of drive roll(s) and a woven-wire belt of a conveying system. The effect is in the opposite direction from heat treatment operations and is compensated for in accordance with present teachings. That is, by changing widthwise dimension from each widthwise side of a protrusion, the widthwise shrinkage of a belt, due to temperature treatments below ambient, can be handled along with compensation for widthwise expansion of a belt due to temperature treatments above ambient.

Preferably, centerline protrusions, such as those of circumferential row 50 of FIG. 3, are prepared with cross-sectional configurational and dimensional characteristics selected to approximate cross-sectional configurational and dimensional characteristics of the centrally-located recessed area(s) of the woven-wire belt. Because of matching widthwise sides of centrally-located roll protrusion(s) with adjacent parallel helical wrap portions, such centrally-located protrusions can be referred to as "anchor" protrusions. During rotation of the roll 52, such widthwise matching of protrusions and recesses helps to provide substantially-unidirectional tracking of the belt.

Each centrally-located protrusion of circumferential row 50 is selected to have a width dimension, such as 53 in FIG.

3, which corresponds to, and is approximately the same as, the width dimension between the centrally-located confronting surface belt recess. The parallel relationship of widthwise sides of protrusions and helical wraps of the spiral facilitate tracking objectives. The longitudinal-direction dimension 54 of such protrusions can also be selected in relation to that dimension of the Corresponding recess, in order to provide contact for longitudinal drive purposes. Selecting a minimum longitudinal-direction dimension of any drive roll protrusion need only consider providing desired protrusion strength in the longitudinal direction for drive purposes of the selected belt.

In one embodiment, such centrally-located roll protrusion cross-sectional dimensions are established when both the roll and belt are at a selected temperature. Relatively minor compensation for coefficient of expansion or contraction factors is required at such widthwise centerline location of the roll protrusions. The size of the protrusions along such circumferential centerline location is selected based on the size of the recesses defined by the belt selected for operation with the roll.

Protrusions, such as 55, are representative of the protrusions located circumferentially at or contiguous to such widthwise location of the roll. The width of those protrusions, and any contiguous anchor protrusions, is selected because of the significance of such width dimension (s) in providing and maintaining desired tracking of the belt. The number of circumferential rows of such anchor protrusions with matching width dimensions, on each side of a roll centerline, can be selected in relation to the width of the belt in order to maintain desired directional tracking with increasing belt widths. For example, a pair of centrally-located circumferential rows improves the leverage for control of unidirectional tracking over that available with a single centrally-located row. However, balancing of lengthwise drive of a belt on each lateral side of the roll centerline also augments unidirectional tracking of the belt.

As taught herein, changes in widthwise location of belt recesses in relation to the position of protrusions become more pronounced in proceeding from such centrally-located anchor protrusions of the roll toward each lateral edge of the belt. Therefore, effects of temperature differences between the roll and belt are compensated cumulatively in proceeding widthwise from such widthwise central portion of the roll toward each such respective lateral end.

The lengthwise cross-sectional dimension of a protrusion, as mentioned, is maintained so as to provide desired strength for driving a belt across roll width. Also, the effect of temperature on the length of the belt can be accommodated, at other locations during belt travel, such as in the return of an endless travel path. However, changes in widthwise location of belt recesses, due to widthwise expansion of a belt in relation to belt protrusions, are compensated for on the drive roll.

It has been found practicable to use protrusion width dimensions to adequately compensate for a relative change in location of bottom-access recesses of a woven-wire belt, with respect to roll protrusions, in each lateral direction from the centrally-located portion of the roll. Such change in disposition of belt recesses in relation to protrusions on a roll at a differing temperature, is compensated for by selectively changing the widthwise dimension of respective protrusions, progressively, in proceeding from such central location toward each lateral end of the roll. That is, the widthwise dimensions of protrusions are decreased progressively, as indicated by FIG. 3, in proceeding from the centrally-located row 50 toward each lateral end (56, 57) of roll 52.

Selectively decreasing protrusion width, from each lateral side of a protrusion, enables a roll to accommodate changes due to heating, and the relatively minor cooling, encountered in operations where treatment temperature differs from ambient. By changing protrusion widths, the resulting spacing between protrusions is progressively increasing in proceeding toward each lateral end of the roll.

In FIG. 3, protrusions such as 60, 61 near the lateral ends of the roll 52 present the narrowest widthwise dimension 62, 63 respectively, in relation to width 53 of the anchor protrusions in row 50. Such narrow width dimension (for 60, 61) is selected to compensate for the maximum potential lateral change in location of a belt recess (due to a temperature differential) in relation to the respective protrusion at that location, in proceeding from a central location for circumferential row 50. Any increase (or decrease) in the widthwise dimension of the roll relative to belt width, due to a differing coefficient of expansion (or contraction) of the roll from that of the belt can be taken into consideration; but, such coefficients tend to be identical, or substantially identical, in a given steel wire and steel roll system.

When changing widthwise dimensions of protrusions to compensate for the widthwise change in location of belt recesses, the anchor protrusions and those contiguous thereto, widthwise, are selected to sustain desired unidirectional tracking. Longitudinal drive by the roll is maintained across the width of the belt, free of obstructions to seating of recesses on protrusions, by diminishing the width of the protrusions in approaching each lateral end of the roll.

The widthwise change of location of belt recesses relative to the protrusions can be calculated knowing the maximum temperature differential between the roll and the belt expected to be encountered, and providing for cumulative change in proceeding from a central location toward each lateral edge. The width of protrusions, located in a widthwise direction, between anchor protrusions (for example, central protrusion 55) and each lateral end protrusion (such as 60 or 61) is decreased in a uniform progression.

Protrusions located in circumferential rows, at the same lateral distance from the center of the roll, are machined to have the same widthwise dimensions. For smooth operations of the woven-wire belt in combination with the roll, the radial dimension of each protrusion, as well as the cross-sectional dimension(s) contiguous to roll circumference, (shown schematically in elevation in FIG. 4) are important to the desired engagement and disengagement capabilities of a wire belt with shaped protrusions on a drive roll. In practice of the invention, protrusions are shaped and dimensioned in relation to the belt required for the operation. The radial dimension of a protrusion, indicated at level 68 in FIG. 4, presents the cross-sectional dimensions of the protrusion selected for proper seating of the belt. Such proper-seating cross-sectional dimensions continue from level 68 toward the roll surface circumference.

In FIG. 4, dimension 70 indicates the overall height dimension of the protrusion measured radially from roll surface circumference 72. Dimension 70 is selected to approach, but be less than, the depth of a recess of the selected woven-wire belt to be used in combination with the roll. For smooth operations, such maximum radial dimension and the cross-sectional dimensions for proper seating of alternate rows of recesses are preselected. Beveled (rounded) edge portions 73, 74 of a protrusion start from a location radially contiguous to such level 68 of the protrusion.

Rounded edges 73, 74, of the protrusions, facilitate smooth engagement of the belt with, and disengagement from, the roll. But, such beveled edges are limited in radial dimension so as to enable belt recesses to adequately seat on the maximum cross-sectional (width) portions of the protrusions contiguous to circumference 72.

Also, an otherwise cylindrical peripheral surface 72 of the roll is machined to present a slightly-recessed, substantially-planar surface as shown at surface 75 (FIG. 4) which is located circumferentially between protrusions 76, 78 of the roll. Such substantially-planar surfaces, machined slightly below the cylindrical circumference 72, as shown in cross section of the roll, continue around the roll such that non-seating portions of the belt (to which access is obstructed by a helical wrap) do not interfere with seating of the open-access recesses, of the confronting surface of the belt, on protrusions across the width of the roll. That is, the undercut surface (75, FIG. 4) is selected and provided such that a helical wrap of a spiral at a non-seating location does not interfere with seating of the open-access recesses on a cylindrical roll surface, such as that provided by circumference 72.

Preferred positioning of the protrusions on the roll provides for the smooth engagement of the belt with the roll, with belt recesses being seated on roll protrusions so as to provide balanced lengthwise drive across the width of the belt and, also, provides for smooth disengagement from the roll.

The specially-shaped and dimensioned protrusions are selectively positioned in rows which are parallel circumferentially and widthwise of the cylindrical roll. A preferred arrangement, dependent of the conveyed load, is to have each alternate row of recesses, in the lengthwise direction of a balanced weave belt, engage a circumferentially-spaced roll protrusion. Areas between such sequentially-spaced rows of protrusions are slightly undercut as shown at 75 (FIG. 4), to assure that the alternate non-seating portions of spiral wire components do not interfere with seating of remaining alternate row belt recesses on roll protrusions.

Referring to belt 80, and the portion shown in FIG. 5, recesses defined by alternate spiral wires 82, 83, and associated connector rods are seated on circumferentially-spaced protrusions 84, 85, with substantially-planar undercut surface 86 preventing interference of helical wraps of spiral 88, with such seating of protrusions 84, 85 within recesses of spirals 82, 83.

The protrusion pattern, dimensions and spacing are selected to avoid interference with driving of the belt, notwithstanding possible temperature differentials between a roll and a belt. The following data refer to a specific embodiment, as described above.

| Tabulated Data for a specific Embodiment | |
|---|---|
| Roll width dimension | 32 inches |
| Roll material | High carbon steel |
| Woven-wire belt width | 30 inches |
| Woven-wire belt material | Low carbon steel |
| Coefficients of expansion for high carbon and low carbon steel are about the same | 12 × 10 – 6/° C. |
| Maximum potential difference in temperature of roll and belt | 300° C. |
| Dimensions of protrusion 55 | |
| FIG. 3 lengthwise (54) | .375 inches |
| widthwise (53) | .562 inches |
| Distance from central location to center of protrusion near each end of roll | 15 inches |

| -continued | |
|---|---|
| Tabulated Data for a specific Embodiment | |
| Decrease in width of protrusion located near each lateral end of roll | .054 inches |

In a specific embodiment for manufacture of rolls, in accordance with the invention, the protrusions at selected locations on a roll as shown in FIG. 2, can be provided by automated machining of the roll surface. Individual configurations and spacing, as described above in relation to FIG. 3, can then be carried out by manual control of machining at selected locations of FIG. 2, so as to provide increased spacing widthwise by progressively decreasing the widthwise dimension of the protrusions in proceeding from such central location toward each lateral end of the roll, as described above.

In the alternative, computer assisted machining can be utilized to control the changes in widthwise dimensions of the protrusions as shown in FIG. 3 and described above. Beveled shaping of protrusion edges is then carried out, as described above, and shown schematically in relation to FIGS. 4, 5.

Variations in materials, belt recess sizes, spacing of roll protrusions, roll diameters and belt sizes can be selected, in the light of the above description, including the data for the specific embodiment as set forth, without departing from the novel concepts and principles of the present invention. Therefore, in determining the scope of patent coverage for the present invention, reference shall be had to the scope of the appended claims in combination with the above description and data.

What is claimed is:

1. A conveyor system comprising:
   a woven-wire belt assembled from interwoven helically-wound spirals and connector rods, a pair of connector rods being associated with each helically wound spiral to define open-access recesses of uniform cross-sectional configuration and dimension, said recesses extending in uniformly spaced locations across a width of said belt; and
   at least one rotatable member including an outer cylindrical surface symmetrically disposed relative to a central axis of rotation of said member and a plurality of spaced, uniformly radially-oriented protrusions on said outer cylindrical surface for engaging said open-access recesses of said woven-wire belt, each of said protrusions including a parallelogram-shaped body substantially corresponding to the cross-sectional configuration and dimension of correspondingly-located recesses of said woven-wire belt.

2. The conveyor system of claim 1, wherein a widthwise dimension of each of said protrusions is defined by a first pair of parallel sides of said parallelogram-shaped body extending symmetrically with the central axis of rotation of said outer cylindrical surface, the dimension of said parallel sides being no greater than a width defined by alternating helical wraps of the spiral.

3. The conveyor system of claim 2, wherein a lengthwise dimension of each of said protrusions is defined by a second pair of parallel sides of said parallelogram-shaped body extending symmetrically with a length of said woven-wire belt.

4. The conveyor system of claim 1, wherein said plurality of uniformly radially-oriented protrusions are disposed at a predetermined angle, said angle being defined by alternating helical wraps of the spiral of said woven-wire belt.

5. The conveyor system of claim 1, wherein said parallelogram-shaped body of said protrusions includes a first pair of parallel sides and a second pair of parallel sides, said first pair of parallel sides extending symmetrically relative to the central axis of rotation.

6. The conveyor system of claim 1, wherein cross-sectional dimensional characteristics of said protrusions are selected across a width of said rotatable member so as to compensate for differential effects of temperature on the belt width and the open-access recess locations, with respect to said rotatable member protrusions, when operating under conditions during which temperatures other than ambient are encountered by said woven-wire belt during travel in a direction of its length.

7. The conveyor system of claim 1, wherein said protrusion cross-sectional dimensional characteristics and height are selected to provide for smoothly-operating engagement with said open-access recesses, and disengagement from said open-access recesses, free of disturbance of said woven-wire belt, or a conveyed product, during longitudinal travel of said belt in a direction of its assembly, in which varying operational temperatures other than ambient are encountered by said woven-wire belt.

8. The conveyor system of claim 1, wherein said woven-wire belt comprises a balanced woven-wire belt and said protrusions engage said open-access recesses located in preselected rows spaced in the longitudinal direction of assembly of said balanced woven-wire belt.

9. The conveyor system of claim 1, wherein said plurality of protrusions includes a first plurality of protrusions and a second plurality of protrusions, a cross-sectional configuration and widthwise dimension of said first plurality of protrusions of said rotatable member interfit with the cross-sectional configuration and dimension of said open-access recesses contiguous to a widthwise central portion of said woven-wire belt so as to provide for maintaining unidirectional tracking of belt travel in the direction of its length, and a radial height of said protrusions across belt width is selected to be no greater than the depth of said belt recesses.

10. The conveyor system of claim 9, wherein a widthwise dimension of each of said second plurality of protrusions is decreased to compensate for relative widthwise change of location of recesses of said belt, with respect to said rotatable member, due to differential effects of temperature on said belt and said rotatable member during operations at a temperature differing from ambient.

* * * * *